United States Patent [19]

Wetterhorn

[11] 3,807,232

[45] Apr. 30, 1974

[54] EXPLOSION PROOF GAUGE TRANSDUCER

[75] Inventor: Richard H. Wetterhorn, Fairfield, Conn.

[73] Assignee: Dresser Industries, Inc., Dallas, Tex.

[22] Filed: Aug. 23, 1972

[21] Appl. No.: 283,004

[52] U.S. Cl. .................................... 73/418, 73/395
[51] Int. Cl. .............................................. G01l 7/04
[58] Field of Search ............. 73/418, 431, 411, 395

[56] References Cited
UNITED STATES PATENTS

| | | | |
|---|---|---|---|
| 3,338,101 | 8/1967 | Krasnitz et al. | 73/415 |
| 2,841,984 | 7/1958 | Green | 73/395 |
| 3,163,046 | 12/1964 | Huston | 73/368.6 |

*Primary Examiner*—Donald O. Woodiel
*Attorney, Agent, or Firm*—Daniel Rubin

[57] ABSTRACT

An encapsulated, self-contained gauge transducer to provide output information from a variable pressure source to a variety of output devices such as an indicating gauge. A housing contains a Bourdon tube sealed at both ends and surrounded by a fluid fill of incompressible liquid. Pressure variations from a source are communicated via a diaphragm in the housing wall through the liquid fill to be exerted externally against the Bourdon tube. A magnet is operably connected to the free end of the Bourdon tube for rotational displacement therewith in response to tube deflections imposed by pressure change.

9 Claims, 4 Drawing Figures

PATENTED APR 30 1974 3,807,232
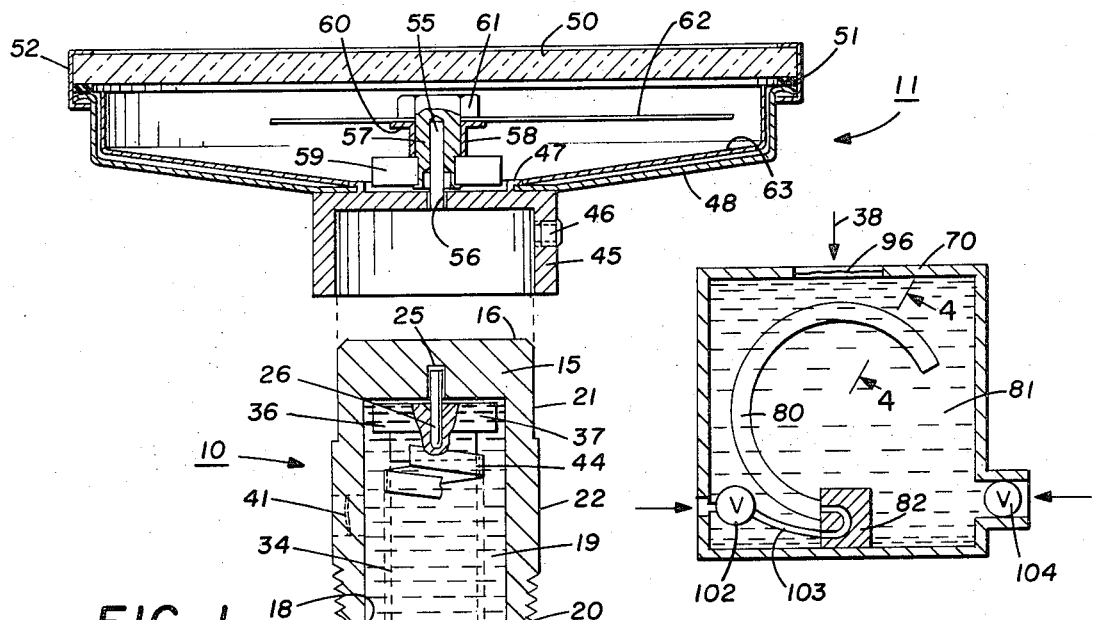
FIG. 1
FIG. 3
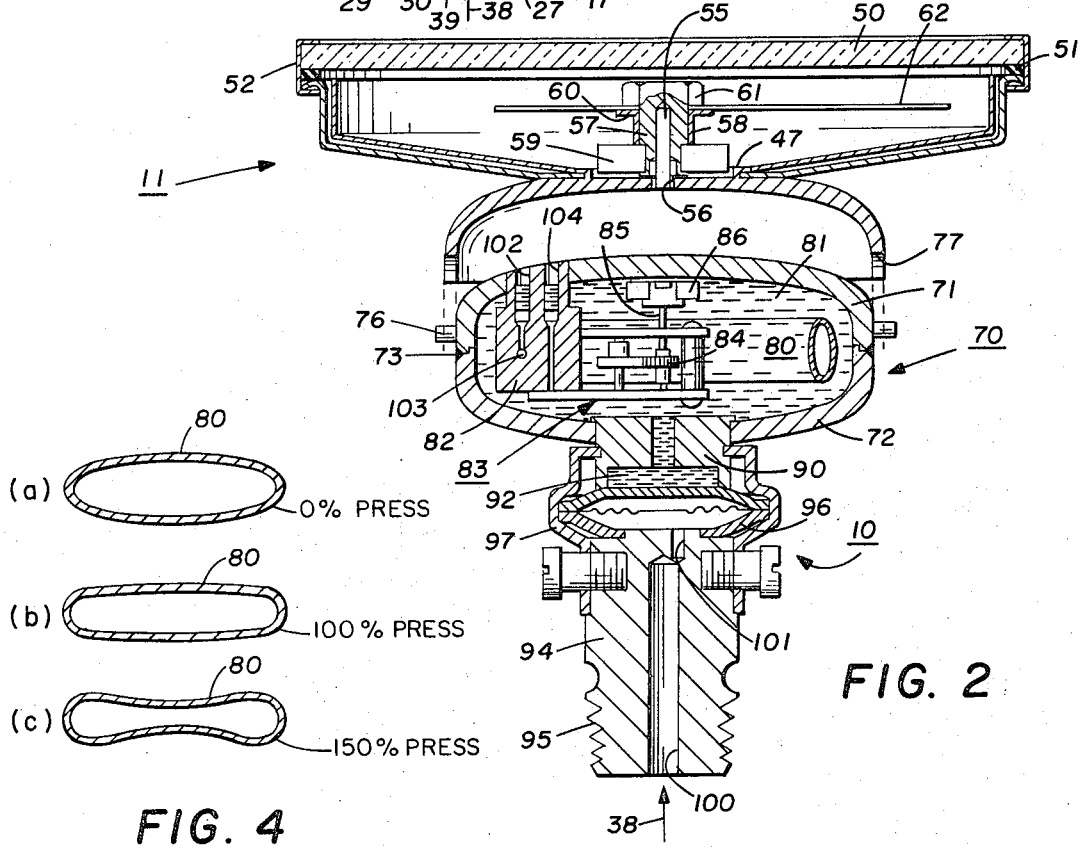
FIG. 4
FIG. 2

EXPLOSION PROOF GAUGE TRANSDUCER

CROSS-REFERENCE TO RELATED APPLICATIONS

Application entitled "Overload Protected Bourdon Tube" co-filed herewith in the name of Robert D. Bissell.

BACKGROUND OF THE INVENTION

1. The field of art to which the invention pertains includes the art of measurement and testing as more specifically directed to pressure sensitive units and their construction.

2. Adaptations of pressure gauges and the like for explosion susceptible service are well-known as exemplified by U.S. Pat. Nos. 3,176,515; 3,177,722; and 3,338,101. The basic objective of such gauges is to minimize likelihood of explosion being transmitted from the pressure source through the gauge to the surrounding environment and to minimize associated hazards should an explosion occur notwithstanding. For that purpose therefore, it is customary to utilize a heavier than normal wall construction frequently comparable to the piping system or pressure vessel with which it is to be used. At the same time, more or less of the components are isolated from each other in order to further minimize the risk of explosion and its consequent hazards. While a variety of such devices are commercially available for this purpose and some are more effective than others in achieving these objectives, the explosion proof features of each are generally integral with the overall instrument of which they are a part rendering them very costly as compared to similar devices without such features.

SUMMARY OF THE INVENTION

The invention relates to a novel form of explosion proof gauge transducer. More specifically, the invention relates to an encapsulated gauge transducer adapted for use with either permanent or detachable indicating apparatus. With this construction, the transducer hereof is completely self-contained and thus functionally independent of indicating gauge apparatus to be used in association therewith. This is achieved in accordance with the invention by means of a generally enclosed housing capsule containing a Bourdon tube sealed at both ends and surrounded by a fluid fill of incompressible liquid. A flexible diaphragm secured in the housing wall is adapted for exposure to a connected pressure source. Changes in pressure level are communicated via the diaphragm for transmitting through the fluid fill surrounding the Bourdon tube. A magnet, displaceable with deflections of the free end of the tube, provides a positioned indicia for readout by the gauge apparatus. By these means, maximum isolation of components is afforded as to minimize explosion hazards to a maximum while at the same time effectively reducing instrument costs by eliminating need for permanent gauge indicators associated therewith.

It is therefore an object of the invention to provide a novel explosion proof gauge transducer.

It is another object of the invention to provide a novel gauge transducer that is self-contained as to be functionally independent of indicating apparatus to be used in association therewith.

It is a further object of the invention to provide an explosion proof gauge transducer in accordance with the aforementioned objects that decreases the risk and hazards of explosion while affording a substantial cost reduction compared to such similar purpose units of the prior art.

BRIEF DESCRIPTION OF THE DRAWINGS

FIG. 1 is a sectional elevation of a first embodiment transducer unit in accordance herewith;

FIG. 2 is a sectional elevation of a second embodiment transducer unit in accordance herewith;

FIG. 3 schematically illustrates a method for limit load pre-conditioning of the Bourdon tube; and FIGS. 4(a), (b) and (c) are simulated sectional views taken substantially along the lines 4—4 of FIG. 3 at various indicated levels of pressure applied externally against the Bourdon tube.

Referring now to FIG. 1, there is shown an encapsulated transducer 10 in accordance herewith adapted for operation with an optionally detachable or permanently mounted indicating gauge apparatus 11. For this embodiment transducer 10 is comprised of a one piece, generally cylindrical tubular housing 15 having an internally elongated well bore 18. The housing is of jointless one piece solid stock dimensioned to withstand pressure levels without rupturing comparable to the piping system or pressure vessel with which it is being used. At its upper end 16 the housing is integrally sealed while per se open at its lower end 17. Formed about the latter is a thread 20 for mounting the transducer into a tapped aperture of the receiving device or system. External flat sides 21 at and near the top are preferably squared to accommodate indicating apparatus 11 whereas external sides 22 immediately below sides 21 include suitable flats for wrench engaging purposes. A drilled internal aperture 25, extends coaxially upward from bore 18 and is adapted to provide a bearing support for a rotatable pin 26 to be described. Internally at the lower end bore 18 merges with a counterbore 27 for accommodating an annular perforated disc 28 and an annular enclosure ring 29 securing a flexible imperforate diaphragm 30 therebetween. Secured on the inside face of disc 28 is a cylindrical collar 34 to which the lower end of helical Bourdon tube 35 is securely affixed. The upper or free end of the Bourdon tube is secured to an axially floating cylindrical collar 36 which, with an annular magnet 37, are rotatably supported via pin 26 in aperture 25.

Bourdon tube 35 for reasons as will be understood, is sealed at both ends and is completely immersed in or surrounded by an incompressible fluid 19, such as silicone or the like, filling bore 18. By this means, system pressure as shown by arrow 38 is exposed to the underside of diaphragm 30 through ring bore 39. Via a plurality of angularly displaced small apertures 40 in disc 28, pressure changes applied against the diaphragm are transmitted to fluid fill 19 in bore 18. In turn, pressure changes against the fluid are exerted externally against the sealed Bourdon tube causing it to deflect with a winding and unwinding motion that effects a corresponding angular displacement of magnet 37. For these purposes diaphragm 30 should be capable of displacing sufficient fluid volume for deflecting the Bourdon tube through at least its normal operating range. Preferably the ID of Bourdon tube 35 is slightly greater than the OD of collars 34 and 36. This enables accommodating reduction in tube ID in response to wind-up motion thereof such that at maximum operating pressure, the tube ID and collar OD substantially coincide. It should be appreciated that as thus far described, the arrangement affords absolute rather than gage pressure sensitivity by virtue of its isolation from the effects of atmospheric pressure changes. Use of an optional diaphragm 41 in the housing wall communicating atmospheric pressure to the fluid fill or appropriately venting the tube internally to atmosphere can convert the unit to gage pressure sensitivity when required.

As an optional feature, the axial length of collar 34 can be extended as shown in phantom outline to a termination juxtaposed to the face of collar 36 defining a gap 44 of on the order of about 0.005 inches. The longer collar affords several distinct advantages as compared to the relatively shorter collar shown solid. One advantage is enhanced viscous dampening. Another is the additional support provided over the entire axial length of the tube. In the event of an inadvertent overpressure applied against the tube, the collar acts to limit tube ID to effectively afford an overload limit stop thereto. At the same time, defined gap 44 limits axial movement of both the tube and magnet for avoiding axial distortion of the tube that might otherwise occur. Still another advantage is an effective form of temperature compensation enabled thereby. Should temperature changes to which the transducer is exposed have the effect of altering fluid volume at a different or greater rate than that the volume of bore 18, the spring rate of diaphragm 30 will effectively introduce a temperature imposed pressure error onto tube 35. By replacing fluid volume with increased volume of collar 34 and constructing the collar of a material such as quartz, having a cubical coefficient of thermal expansion substantially lower than that of the housing, the effect of temperature related error is substantially eliminated. This can likewise be controlled to a limited extent by maintaining the volume of bore 18 at a minimum required to accommodate the liquid fill about the Bourdon tube. Hence, increasing collar length enables a balancing of volume changes between the liquid and surrounding parts such that net volume acting against the diaphragm as a factor of temperature becomes essentially zero.

Indicating apparatus 11, as illustrated in FIG. 1, is essentially of conventional design but including a rectangular collar 45 adapted to slip onto the head of transducer 10 whereat it can be secured, if desired, by means of a set screw 46. Rigidly attached and hermetically sealed to the collar by staked-over flanges 47 is a cup shaped annular casing 48. Frontward of the casing (topside as illustrated) is a transparent crystal 50 overlying an annular gasket 51 and secured to the casing by means of an annular bezel ring 52. An axially located pin 55 rotatably supported in bearing aperture 56 carries a stud 57 on which is secured a bushing 58. Attached to the bushing is a magnet 59 and a spring washer 60 which with a nut 61 secures a rotatable pointer 62 for displacement relative to dial plate 63.

The second transducer embodiment hereof for accommodating a C-shaped Bourdon tube will now be described with specific reference to FIG. 2. In this construction, transducer housing 70 is comprised of two semi-ovular sections 71 and 72 joined together by an encircling weld 73. Extending radially outward of the housing on opposite sides thereof are ears 76 for accommodating receipt of bifurcated indicator collar 77. Bourdon tube 80 is of a conventional C-type and, like Bourdon tube 35, is sealed at both ends in order that fluid fill 81 internally of the housing can act externally against the tube. For these purposes, the fixed end of the Bourdon tube is secured to the unseen side of a block 82 whereas its free end (not shown) connects to a gauge movement 83 in a conventional manner. Movement 83 customarily includes a pinion 84 driving a pinion shaft 85 to which a magnet 86 is secured.

Extending through the underside of housing 70 is a pressure tight plug 90 having a bore 91 that merges with a counterbore 92. Sandwiched between the plug and a socket 94 having pipe threads 95 is a diaphragm capsule 96 which may, for example, be of a type disclosed in patent U.S. Pat. No. 3,202,063 secured in pressure tight relation therebetween by means of a peripheral clamp 97. System pressure in this embodiment is again indicated by arrow 38 and is transmitted through socket bore 100 communicating with offset bore 101 which in turn is exposed to the underside of diaphragm capsule 96.

Each of Bourdon tubes 35 and 80 in accordance herewith are preferably pre-conditioned for presetting an overload limit beyond which the tube cannot be operated. A mechanical construction for that purpose is disclosed in German patent 748,236 while a preferred construction will now be described with reference to FIGS. 3 and 4. For the respective Bourdon tube configurations shown pre-conditioning of tube 35 is preferably conducted prior to its insertion into transducer well 18 whereas for tube 80 it is preferably effected post insertion within housing 70, as shown schematically in FIG. 3. Considering the second embodiment first, tube 80 while at zero pressure and having a cross section as substantially shown in FIG. 4(a) is filled with an incompressible fluid, such as liquid silicone or glycerin, via a valve 102 controlling filler tube 103. The tube connects to the otherwise sealed Bourdon tube through block 82. With valve 102 in its open relation, incompressible fluid is supplied through a valve 104 to the housing cavity surrounding the Bourdon tube. Cavity pressure acting externally against tube 80 is then gradually increased causing internal tube volume to gradually decrease in a changing cross section from that simulated in FIGS. 4(a) to 4(b) to 4(c). The latter simulates a cross section at some arbitrary pressure level above operating range but below the overstress level as for example, 150 percent of rated operating pressure. While the internal volume is thus being decreased, valve 102 is continuously maintained open for escape or release of internal fluid previously supplied.

On reaching the relation of FIG. 4(c), valve 102 is closed trapping an internal fluid volume precisely corresponding to a minimum volume to be subsequently permitted in response to whatever levels of external overpressure are thereafter applied. During normal operation thereafter, the tube is not expected to exceed 100 percent of rated capacity. Should an overpressure be applied inadvertently or otherwise, the tube is permitted by virtue of the internal fluid to deflect normally only insofar as the pressure does not exceed the pressure level correlated to the trapped fluid volume. At such time, attempts to effect additional deflection from further pressure increases tending to further reduce the tube cross section is positively precluded by the confined fluid. Consequently, further deflection cannot occur beyond the imposed fluid limit such that application of pressure overstress otherwise likely to effect partial or total destruction of the tube and/or instrument is positively prevented. Not only is the tube protected by this arrangement, but at the same time, overload protection is simultaneously afforded diaphragms 30 and 96. That is, with the tube prevented from further deflection at the overload limit, the externally surrounding fluid is likewise prevented from transmitting further pressure increases thereby supporting the diaphragm against any additional displacement that higher pressure would otherwise impose.

For the embodiment of FIG. 1, the transducer could be modified to accommodate tube pre-conditioning in foregoing manner. However, as shown, the tube is placed in a separate chamber for similar pre-conditioning after which it is removed for placement into the transducer capsule. Respecting the pre-conditioning procedure, it should be appreciated that the sequence in which fluid is supplied internally of the tube is interchangeable. That is, it can be performed either prior or subsequent to reaching the 150 percent pressure level by either bleeding or initially supplying fluid at that point respectively, it being important only that fluid volume and tube volume correspond at the desired pressure level.

In operation, system pressure exposed to the underside of either diaphragm 30 or diaphragm capsule 96 is transmitted through the fluid in the housing cavity for application externally against the sealed Bourdon tube. In response to an increasing pressure, the free end of the Bourdon tube undergoes normal deflection for rotatably displacing the magnet secured thereto. With indicating device 11 supported on the transducer, its co-acting magnet 59 effects a magnetic coupling with the transducer magnet in the process of which pointer 62 is displaced relative to dial plate 63.

By the above description there is disclosed an encapsulated gauge transducer for affording maximum explosion protection from a system with which it is to be used. It will be appreciated from the foregoing that transducer 10 in accordance herewith is adapted for connecting to a pressure source in process piping, pressure vessel or the like for responding to pressure changes therein. While highly sensitive to the incurred pressure changes it is otherwise isolated completely from the indicating apparatus whereby fire in the connected system is confined and unable to be spread to the surrounding environment either directly or through the indicating mechanism. By virtue of being self-contained without necessarily being permanently secured to an indicating device, its construction cost is minimal as compared to such similar purpose constructions of the prior art. At the same time, complete overload protection is provided not only to the tube but simultaneously to the pressure transmitting diaphragm as well.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention to which an exclusive property or privilege is claimed are defined as follows:

1. An explosion proof gauge transducer comprising in combination:
   a. a substantially encapsulating housing;
   b. a Bourdon tube within said housing, said Bourdon tube being sealed at both its ends including a first end fixedly secured against movement and a second end free for deflection movement in response to pressure changes to which it is externally exposed;
   c. magnet means operably connected to said second tube end for displacement in correlation with the deflection movement thereof;
   d. an incompressible fluid fill within said housing in surrounding relation to said Bourdon tube;
   e. diaphragm means exposed on one surface to said fluid fill and adapted for exposure of another surface to a connected pressure source to communicate pressure changes from said pressure source through said fluid to externally against said Bourdon tube; and
   f. overload protection means within said housing for protecting said Bourdon tube and said diaphragm means against the effects of a predetermined overpressure applied by said pressure source, said protection means comprising deflection limiting means imposed on said Bourdon tube for limiting deflection response thereof to a predetermined value of increasing pressure.

2. A transducer according to claim 1 in which said Bourdon tube is C-type.

3. A transducer according to claim 1 in which said Bourdon tube extends helically within said housing.

4. A transducer according to claim 3 in which said protection means includes an annular collar extending inwardly of said housing and the Bourdon tube at said first end is fixed secured to said collar to be coaxially positioned thereon, said collar being of diameter corresponding substantially to the internal diameter of the tube when exposed to the maximum pressure at which it is intended to operate.

5. A transducer according to claim 4 in which said collar extends linearly through the coil of said Bourdon tube for at least a substantial portion of its coil length to support said tube against diametral contraction when subject to a predetermined overpressure exceeding said maximum pressure.

6. A transducer according to claim 1 including accommodating means adapted to receive a magnetically actuated intelligence readout unit in magnetically coupled relation with said magnet means.

7. A transducer according to claim 6 in which said accommodating means provides for detachable receipt of said readout unit.

8. A transducer according to claim 1 in which said housing is of jointless one piece solid stock of tubular section having rupture characteristics substantially comparable to the system with which it is to be used, and having an open end in which to support said diaphragm.

9. A transducer according to claim 8 including a perforated disc member intermediate said diaphragm and the fluid fill in said housing and an annular ring securing said diaphragm against said disc in the open end of said housing.

* * * * *